April 9, 1957 — N. H. SHOUP — 2,787,834
GRATING STRAIN GAUGES
Filed Feb. 16, 1954

INVENTOR.
Norman H. Shoup
BY
D. C. Snyder
Paul M. Klein Jr.
Attorneys

United States Patent Office 2,787,834
Patented Apr. 9, 1957

2,787,834

GRATING STRAIN GAUGES

Norman H. Shoup, Pullman, Wash., assignor, by mesne assignments, to the United States of America as represented by the Secretary of the Navy Application February 16, 1954, Serial No. 410,745

4 Claims. (Cl. 33—147)

This invention relates to grating strain gauges. Particularly, this invention relates to a grating strain gauge of light weight construction which can be mounted directly on a specimen to be subjected to strain wherein two superimposed, overlapping gratings are fixed to spaced points on the specimen and are caused to move relative to one another as the spacing between the points changes under strain, the strain being measured by the variation in the amount of light passing through the overlapping portions of the gratings.

Prior art grating strain gauges such, for example, as that shown in U. S. Patent No. 2,293,289 are relatively complicated, cumbersome, and so bulky and heavy as to be unsuitable for use with small or light specimens.

A principal object of the present invention is to provide a grating strain gauge which is of simple construction and is sufficiently compact and light in weight to enable it to be used readily on all types of specimens including specimens which may be small and light in weight such as those made of plastic and exhibiting considerable softness and ductility.

Other objects and many of the attendant advantages of this invention will be readily appreciated as the same becomes better understood by reference to the following detailed description when considered in connection with the accompanying drawing wherein.

Figure 1:
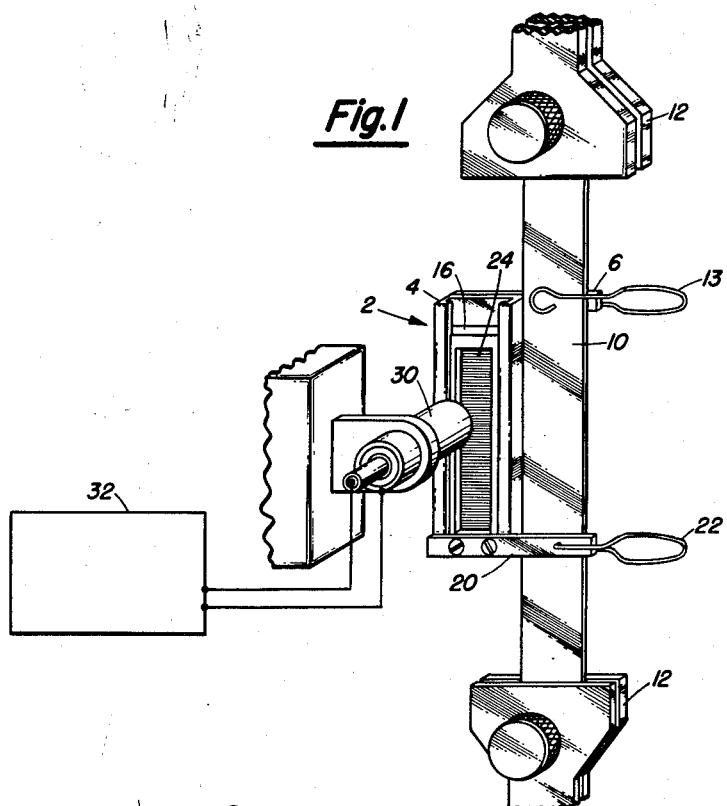
Fig. 1 is a perspective view of a preferred embodiment of the invention shown in association with a specimen mounted for testing.
Figure 2:
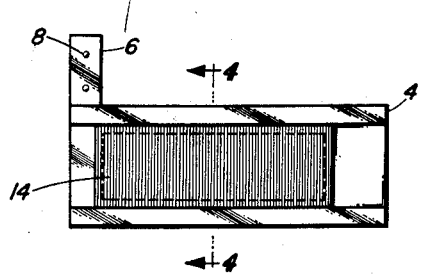
Fig. 2 is a front view of the body frame of the strain gauge of Fig. 1.
Figure 3:
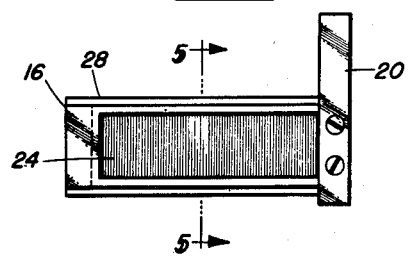
Fig. 3 is a front view of the slide frame of the strain gauge of Fig. 1.
Figure 5:
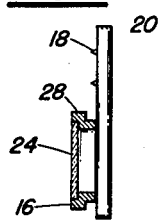
Fig. 5 is a cross section taken along the line 5—5 in Fig. 3.
Figure 4:
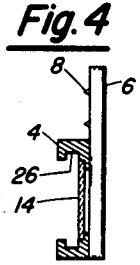
Fig. 4 is a cross section taken along the line 4—4 in Fig. 2.

Reference is now made to the drawing for a detailed description of a preferred embodiment of the invention. Numeral 2 indicates generally an assembly constituting the principal component of the strain gauge of this embodiment. This assembly includes a body frame 4, generally rectangular in shape, and having an arm portion 6 provided with a pair of mounting points 8 by which the frame can be clamped to a specimen, such as 10, mounted in the jaws 12 of a testing machine. To fasten the frame 4 to the specimen 10 a simple spring wire clamp 13 is used, pressing the points 8 more or less lightly against a gauge line (not shown) inscribed on the specimen 10. The body frame 4 is provided with a grating 14 mounted in the frame with its lines parallel to the short side or width of the frame.

The grating 14 can be made in any convenient, known fashion. Satisfactory gratings have been made by photographing a machine ruled metal plate. This plate is prepared by machining equally dimensioned grooves and lands, filling the grooves with a dark material, and polishing the surface so that well defined alternating opaque and transparent lines can be reproduced on a photographic plate. By photographic reduction on a glass plate, cut to suitable size, the desired spacing is obtained. The glass plate is then simply mounted in the frame 4.

A slide frame 16, generally similar to the body frame 4, is attached by means of mounting points 18 on arm 20 to the specimen 10 at a gauge line (not shown) spaced from the gauge line receiving points 8. The slide frame is held against the specimen by a spring wire clamp 22 similar to clamp 14. A grating 24 identical to grating 14 is mounted in the slide frame 16. The body frame 4 and slide frame 16 are provided with interengageable guide surfaces 26 and 28, respectively, to facilitate relative sliding motion between the two frames while maintaining the lines of both gratings parallel to each other and perpendicular to the direction of relative sliding which is coincident with the direction of the relative motion of the two gauge lines on the specimen 10 while the specimen undergoes strain. A photocell 30 is used to respond to the cyclic variations in light caused by relative motion of the gratings and transmitted from a suitable source (not shown) through the two superimposed gratings 14 and 24. The electrical output of the photocell is amplified and recorded if desired as a function of time or other variables by means of an oscillograph 32 or the like.

*Operation*

To use the device, a pair of gauge lines are inscribed at spaced locations on the specimen 10 to be tested. The body frame 4 and the slide frame 16 are clamped to the specimen 10 by means of clamps 14 and 22 with the respective mounting points of the frames engaging the appropriate gauge line on the specimen. The gratings 14 and 24 now overlap. The source of illumination (not shown) is turned on and the photocell is illuminated by the light from the source passing through the overlapping superimposed gratings. As the specimen 10 is subjected to strain, either elongation or compression, the gratings move relative to one another causing a cyclic variation in the light received by the photocell as the opaque lines on one grating periodically fall directly over and then between the opaque lines of the other grating.

It is apparent that the gauge proper can easily be made light in weight, using aluminum or the like, so as to minimize clamping pressure and distortion of small test specimens. The light source and associated water cooling cell, if needed, prism, if needed, and photoelectric cell assembly are separate items which need not be mounted on the test specimen. This provides flexibility of design and permits the light, as a heat source, to be removed from the vicinity of the specimen, thus avoiding the risk of local heating effects in temperature sensitive materials. The cyclic strain record provides a convenient measure of strain rate in addition to strain values related, through chart time as a parameter, to the other recorded variables, e. g. stress. The gauge has the unique advantage of being able to indicate accurately extremely large strains. Since the gauge is essentially a cyclic counting device, the accuracy of the gauge is primarily a function of the uniformity of the gratings; and, as such, the accurate range of the gauge is limited only by the physical proportions of the gratings, for the reason that such gauges can easily be ruled with a very high degree of accuracy.

Obviously, many modifications and variations of the present invention are possible in the light of the above teachings. It is therefore to be understood that within the scope of the appended claims the invention may be practised otherwise than is specifically described.

What is claimed is:

1. A strain gauge for measuring the strain of a specimen to be tested comprising a first grating consisting of a plurality of uniformly spaced alternating opaque and transparent lines, means for fastening said first grating directly to said specimen at a first fiducial point so that said grating moves in the same direction as and undergoes substantially exactly the motion of said fiducial point, and with the lines of the grating extending perpendicular to the direction of strain of the specimen; a second grating substantially identical with the first grating; means for fastening said second grating directly to said specimen at a second fiducial point so that said second grating moves in the same direction as and undergoes substantially exactly the motion of said second fiducial point, and with the lines of said two gratings parallel to each other and at least some of said lines overlapping during the entire contemplated strain of the specimen; means for guiding the motion of each of said gratings to remain parallel to the other; a light source arranged to transmit light through the overlapping area of said gratings; and means for recording the variations in light intensity transmitted through said gratings.

2. A strain gauge for measuring strain in a specimen comprising a first generally rectangular frame; a grating carried within said frame with its lines parallel to the width of the frame; an arm projecting from the frame provided with a plurality of mounting points adapted to engage a test specimen directly and free of any intermediary pivotal connections so that said grating will move in the same direction as and undergo substantially exactly the motion of the test specimen at the location of engagement of the arm with the specimen; a second generally rectangular frame; a second grating carried within said second frame with its lines parallel to the width of said second frame; an arm projecting from said second frame provided with a plurality of mounting points adapted to engage a specimen directly and free of any intermediary pivotal connections so that said second grating will move in the same direction as and undergo substantially exactly the motion of the test specimen at the location of engagement of its arm with the specimen; inter-engaging guide surfaces on said frames to enable said frames to slide longitudinally relative to each other with the gratings superimposed upon one another; and spring wire clamps adapted to fasten the frames to a specimen and urge the mounting points into engagement with the specimen.

3. A device of the character described comprising a first frame; a grating carried by said frame; means for attaching said frame directly to a specimen to be tested so that the frame lies to one side of said specimen and so that said grating moves in the same direction as and undergoes substantially exactly the motion of the specimen at the location at which the frame is attached to the specimen; a second frame; a grating carried by said second frame; means for attaching said second frame directly to said specimen so that said second grating moves in the same direction as and undergoes substantially exactly the motion of the specimen at the location at which said second frame is attached to said specimen; said frames being adapted to be mounted relative to one another so that the grating of one frame is superimposed, at least in part, on the grating of the other with the lines of the two gratings parallel to each other; and means on said frames coacting to guide the relative motion of said frames in the direction of the strain of said specimen which direction is perpendicular to the grating lines and generally parallel to the planes of said gratings.

4. The device of claim 3 including means for transmitting light through the superimposed gratings and means for indicating the variation in light transmitted through said gratings as the strain of said specimen varies.

References Cited in the file of this patent

UNITED STATES PATENTS

| | | |
|---|---|---|
| 2,246,001 | Powers | June 17, 1941 |
| 2,293,289 | Gadd | Aug. 18, 1942 |
| 2,351,955 | Graf | June 20, 1944 |
| 2,376,038 | Dawson | May 15, 1945 |
| 2,588,630 | Jackman | Mar. 11, 1952 |
| 2,667,699 | Buist et al. | Feb. 2, 1954 |